United States Patent
Rettich et al.

(10) Patent No.: US 11,573,076 B2
(45) Date of Patent: Feb. 7, 2023

(54) METHOD FOR ADJUSTING A BEAM PATH FOR TRACKING AN OBJECT

(71) Applicant: Carl Zeiss Industrielle Messtechnik GmbH, Oberkochen (DE)

(72) Inventors: Florian Rettich, Munich (DE); Wolfgang Högele, Stephanskirchen (DE); Volker Rasenberger, Raubling (DE); Thomas Mayer, Kolbermoor (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 17/005,264

(22) Filed: Aug. 27, 2020

(65) Prior Publication Data
US 2021/0063138 A1    Mar. 4, 2021

(30) Foreign Application Priority Data
Aug. 27, 2019  (DE) ..................... 10 2019 212 856.4

(51) Int. Cl.
   *G01B 9/02*     (2022.01)
   *G01B 11/14*   (2006.01)

(52) U.S. Cl.
   CPC .......... *G01B 9/02083* (2013.01); *G01B 11/14* (2013.01)

(58) Field of Classification Search
   CPC .. G01B 9/02083; G01B 11/14; G01B 11/005; G01S 7/4812; G01S 7/4818; G01S 17/34;
   (Continued)

(56) References Cited

U.S. PATENT DOCUMENTS 5,061,062 A  * 10/1991  Schneiter .............. G01B 11/24
                                                                     356/3.05
8,913,636 B2    12/2014  Roos et al.
(Continued)

FOREIGN PATENT DOCUMENTS

DE     102013014045 A1    3/2015
DE     102018222629 A1    7/2019
(Continued)

OTHER PUBLICATIONS

Office Action of the German Patent and Trademark Office dated Aug. 10, 2021 (Priority Application No. DE 10 2019 212 856.4) and English-language translation thereof.
(Continued)

*Primary Examiner* — Hwa Andrew Lee
(74) *Attorney, Agent, or Firm* — Ewers IP Law PLLC; Falk Ewers

(57) ABSTRACT

An apparatus for adjusting a beam path for tracking an object includes an illumination unit to generate an illumination light beam, an optical unit with a beam expander optical unit and a beam deflection unit, the beam expander optical unit being configured to divergently expand the illumination light beam and the beam deflection unit being configured to deflect the illumination light beam spatially about two different axes of rotation, a detector unit to capture a light beam reflected by the object in response to an illumination by the illumination light beam and to generate a measurement signal, an evaluation and control unit to evaluate the measurement signal and configured to determine a manipulated variable for setting an effective focal length of the beam expander optical unit and/or for setting a spatial alignment of the beam deflection unit based on the information item in respect of the illumination of the object.

12 Claims, 3 Drawing Sheets

(58) Field of Classification Search
CPC ......... G01S 17/42; G01S 17/66; G02B 27/30;
G02B 26/101; G02B 26/105
See application file for complete search history.

(56) References Cited

U.S. PATENT DOCUMENTS

| | | |
|---|---|---|
| 9,559,486 B2 | 1/2017 | Roos et al. |
| 9,647,754 B2 | 5/2017 | Geidek et al. |
| 10,240,924 B2 | 3/2019 | Metzler |
| 2011/0007326 A1 | 1/2011 | Daxauer et al. |
| 2013/0050410 A1 | 2/2013 | Steinbichler et al. |
| 2014/0043622 A1 | 2/2014 | Vandenhoudt et al. |
| 2016/0123718 A1 | 5/2016 | Roos et al. |
| 2017/0258531 A1 | 9/2017 | Bodjanski |
| 2019/0162825 A1 | 5/2019 | Bestler et al. |
| 2019/0219698 A1 | 7/2019 | Hoegele et al. |
| 2020/0333460 A1* | 10/2020 | Tsuji ..................... G01S 17/42 |

FOREIGN PATENT DOCUMENTS

| | | |
|---|---|---|
| EP | 3036845 A1 | 6/2016 |
| EP | 2756262 B1 | 4/2017 |
| EP | 3489714 A1 | 5/2019 |

OTHER PUBLICATIONS

Benham Behroozpur Baghmisheh, Chip-scale Lidar, Technical Report No. UCB/EECS.2017-4.

* cited by examiner

METHOD FOR ADJUSTING A BEAM PATH FOR TRACKING AN OBJECT

CROSS REFERENCE TO RELATED APPLICATIONS

This application claims priority to German patent application DE 10 2019 212 856.4, filed Aug. 27, 2019, the entire content of which is incorporated herein by reference.

TECHNICAL FIELD

The disclosure relates to a method for adjusting at least one beam path and an apparatus for adjusting at least one beam path and a coordinate measuring machine. In particular, the present disclosure relates to the field of coordinate measuring technology, in particular for measuring very large components.

BACKGROUND

Very large coordinate measuring machines and/or laser trackers or laser tracers are customarily used in the field of measuring very large components, such as component parts of wind turbines, for example. However, the production of such apparatuses with the desired high accuracy even in the case of large measurement paths and different ambient conditions is complicated and leads to high costs.

Measuring methods are known, in which a measuring head of a sensor optically scans a large component and the measuring head is positioned and aligned in a measurement volume with a distance measuring apparatus and an additional angle measuring apparatus.

By way of example, DE 10 2018 222 629 A1 describes an apparatus for determining at least one spatial position and orientation of at least one object using at least one LIDAR unit.

US 2014/0043622 A1 describes a system for measuring the position of an object in a measurement volume, comprising an optical angle measuring apparatus, which is arranged with a static optical unit and which is configured to measure the azimuth and elevation angle of the object in the measurement volume. In addition to the optical angle measuring apparatus, provision is made of a distance measuring apparatus configured to measure the distance to the object in the measurement volume.

EP 3 036 845 A1 and DE 10 2013 014 045 A1 describe an effector system comprising at least one transmission/capturing apparatus, comprising a detection apparatus for capturing a target object, at least a first closed-loop control system for driving a first servo-system for aligning a beam path between the transmission/capturing apparatus and target object, a second closed-loop control system for driving a second servo-system for aligning the beam path, and a third closed-loop control system for driving a third servo-system for aligning the transmission/capturing apparatus, the third closed-loop control system comprising an additional capturing apparatus and the third servo-system being driveable on the basis of the data of the additional capturing apparatus.

Further methods, such as the triangulation method, for example, operate with a collimated beam. By way of example, EP 2 756 262 B1 describes a method with a collimated beam, the measuring accuracy being based on the exact knowledge of the position of the beam adjusting unit.

However, such known methods and apparatuses are complex and require at least two measurement systems: one for measuring the spatial position and one for measuring the angle.

Furthermore, large measurement uncertainties may arise as a result of using different measurement systems for determining the spatial position and for measuring the angle.

SUMMARY

It is therefore an object of the present disclosure to provide an apparatus and a method for adjusting at least one beam path, which at least largely avoid the disadvantages of known apparatuses and methods. In particular, a reliable beam adjustment for tracking a moving object in space with little complexity should be facilitated.

This object is achieved with an apparatus and a method for adjusting at least one beam path for tracking at least one object as described herein.

Hereinafter the terms "exhibit", "have", "comprise" or "include" or any grammatical deviations therefrom are used in a non-exclusive way. Accordingly, these terms can refer either to situations in which, besides the feature introduced by these terms, no further features are present, or to situations in which one or more further features are present. For example, the expression "A exhibits B", "A has B", "A comprises B" or "A includes B" can refer both to the situation in which no further element aside from B is provided in A (that is to say to a situation in which A consists exclusively of B) and to the situation in which, in addition to B, one or more further elements are provided in A, for example element C, elements C and D, or even further elements.

Furthermore, it is pointed out that the terms "at least one" and "one or more" and grammatical modifications of these terms or similar terms, if they are used in association with one or more elements or features and are intended to express the fact that the element or feature can be provided singly or multiply, in general are used only once, for example when the feature or element is introduced for the first time. When the feature or element is subsequently mentioned again, the corresponding term "at least one" or "one or more" is generally no longer used, without restriction of the possibility that the feature or element can be provided singly or multiply.

Furthermore, hereinafter the terms "preferably", "in particular", "by way of example" or similar terms are used in conjunction with optional features, without alternative embodiments thereby being restricted. In this regard, features introduced by these terms are optional features, and there is no intention to restrict the scope of protection of the claims, and in particular of the independent claims, by these features. In this regard, the disclosure, as will be recognized by the person skilled in the art, can also be carried out using other configurations. In a similar way, features introduced by "in one embodiment of the disclosure" or by "in one exemplary embodiment of the disclosure" are understood as optional features, without the intention being thereby to restrict alternative configurations or the scope of protection of the independent claims.

Furthermore, all possibilities of combining the features introduced by these introductory expressions with other features, whether optional or non-optional features, are intended to remain unaffected by said introductory expressions.

In a first aspect of the present disclosure, an apparatus for adjusting at least one beam path for tracking at least one object is proposed. The apparatus comprises:

at least one illumination unit configured to generate at least one illumination light beam;

at least one optical unit, the optical unit having at least one beam expander optical unit and at least one beam deflection unit, the beam expander optical unit being configured to divergently expand the illumination light beam and the beam deflection unit being configured to deflect the illumination light beam spatially about at least two different axes of rotation;

at least one detector unit configured to capture a light beam reflected by the object in response to an illumination by the illumination light beam and to generate at least one measurement signal, at least one evaluation and control unit configured to evaluate the measurement signal, evaluating the measurement signal comprising a determination of at least one information item in respect of the illumination of the object, the evaluation and control unit being configured to determine at least one manipulated variable for setting an effective focal length of the beam expander optical unit and/or for setting a spatial alignment of the beam deflection unit on the basis of the at least one information item in respect of the illumination of the object.

An "apparatus for adjusting" can be understood to mean an apparatus configured to adapt and/or modify a beam path. A "beam path" can be understood to mean a geometric extent of at least one light beam through the apparatus. In particular, the apparatus is configured to track a moving object. "Tracking" can be understood to mean capturing the object at different times and/or at different positions of the object in space.

An "object" in the context of the present disclosure can be understood to mean an object to be measured that has any shape. The object can be configured to reflect an incident light beam. By way of example, the object can be and/or can have a retroreflector. The object can be and/or can have an arrangement of a plurality of retroreflectors. A "retroreflector" in the context of the present disclosure can be understood to mean any apparatus that reflects a light beam into the direction from which the light beam is incident. By way of example, the retroreflector can be a marker. By way of example, the retroreflector can be selected from the group consisting of: a cat's eye; a cat's eye with a reflection layer; a spherical lens with a reflection layer; a marker as described in US 2011/0007326 A1, US 2013/0050410 A1 or US 2017/0258531 A1, the content of which is herewith incorporated into this application; a cube prism; a corner cube. By way of example, the retroreflector can be arranged on a measuring head of a sensor or a tool, with which a component can be probed.

An "illumination light beam" in the context of the present disclosure can be understood to mean, in principle, any light beam that is emitted and/or radiated for the purposes of illuminating the object. In the context of the present disclosure, "light" can be understood to mean electromagnetic radiation in at least one spectral range selected from the visible spectral range, the ultraviolet spectral range and the infrared spectral range. The term visible spectral range encompasses, in principle, a range of 380 nm to 780 nm. The term infrared (IR) spectral range encompasses, in principle, a range of 780 nm to 1000 µm, wherein the range of 780 nm to 1.4 µm is designated as near infrared (NIR) and the range of 15 µm to 1000 µm is designated as far infrared (FIR). The term ultraviolet encompasses, in principle, a spectral range of 100 nm to 380 nm. In the context of the present disclosure, a "light beam" can be understood to mean, in principle, a quantity of light which is emitted and/or radiated in a specific direction. An "illumination unit" can be understood to mean an apparatus configured to produce the at least one illumination light beam. The illumination unit can have a light source, in particular a laser source. The illumination unit can have at least one optical fiber configured to guide the light beam generated by the light source to the optical unit.

An "optical unit" can be understood to mean an apparatus having at least one optical element. In particular, the optical unit can be a system comprising a plurality of optical elements. By way of example, the optical elements can comprise at least one lens and/or at least one lens system and/or at least one mirror and/or a mirror array. In the propagation direction of the illumination light beam, the optical unit can be arranged downstream of the illumination unit in the beam path.

A "beam expander optical unit" can be understood to mean an optical element configured to expand an incident light beam. The beam expander optical unit is configured to divergently expand the illumination light beam. "Divergent" can be understood to mean that an opening angle of the beam path is greater than zero at any beam expansion. A beam cross section can increase with increasing distance. The beam expander optical unit can be configured to continuously or incrementally expand the illumination light beam. By way of example, the beam expander optical unit can have at least a lens and/or a lens system comprising a plurality of lenses. By way of example, the beam expander optical unit can have at least one diverging lens. The beam expander optical unit can have at least one lens with a negative focal length. The beam expander optical unit, in particular the lens system, can have an adjustable and/or controllable and/or adaptable effective focal length. An "effective focal length" can be understood to mean a focal length of the lens system having a plurality of lenses, each with a focal length. By way of example, the effective focal length can be adjusted and/or adapted by altering a position of at least one lens in the lens system. The beam expander optical unit can be connected to the evaluation and control unit, for example via an electronic link, said evaluation and control unit being configured to control and/or adapt the beam expander optical unit, in particular to set the position of the lenses in the lens system.

A "beam deflection unit" can be understood to mean an optical element configured to deflect the illumination light beam spatially about at least two different axes of rotation. "Deflect spatially" can be understood to mean a change in the propagation direction of the illumination light beam. "Deflect spatially about at least two different axes of rotation" can be understood to mean a change in the propagation direction of the illumination light beam about at least two different and, in principle, arbitrary axes, in particular a deflection through at least two angles. The axes of rotation can extend perpendicular to the propagation direction of the illumination light beam. The beam deflection unit can be configured to deflect the illumination light beam through at least two angles in a measuring space. Adjusting can be implemented in a coordinate system, for example a Cartesian coordinate system or a spherical coordinate system. Other coordinate systems are also conceivable. An origin or zero of the coordinate system can be at a point of the apparatus. By way of example, the illumination light beam can propagate along a z-axis and the axes of rotation can be the x-axis and a further axis, for example a y-axis. A deflection of the illumination light beam from its original propagation direction can be implemented, for example, through two angles relative to these axes. By way of example, a deflection and/or displacement about the two axes can be implemented perpendicular to the chief ray in the basic alignment. Here, the chief ray in the basic alignment can be directed to a measurement volume centre. However, other axes of rotation are also conceivable. By way of example, the apparatus can be configured to move the optical unit through two angles about the at least two axes of rotation. As an alternative or in addition thereto, the beam deflection unit can have at least one mirror configured to deflect the illumination light beam. By way of example, the beam deflection unit can have exactly one mirror configured to deflect the illumination light beam spatially about the two different axes of rotation. By way of example, the mirror can be embodied as a microelectromechanical system (MEMS) mirror. Alternatively, the beam deflection unit can have at least one first and at least one second mirror, the first mirror being configured to deflect the illumination light beam spatially about a first axis of rotation and the second mirror being configured to deflect the illumination light beam spatially about a second axis of rotation. By way of example, a galvanometer scanner can be provided as a drive for the mirrors.

The optical unit can have at least one collimation optical unit and at least one energy redistribution optical unit which are configured to generate a homogeneously distributed illumination of the object. By way of example, the collimation optical unit can have at least one lens configured to shape a collimated beam from a divergent beam at the distance of the effective focal length of said lens. By way of example, the energy redistribution optical unit can have at least one composite made of an aspherical lens pair configured to generate an energy distribution that is homogeneous over the beam cross section from a Gaussian distribution. A combination can be configured to generate a collimated, homogeneously distributed illumination.

A "detector unit" can be understood to mean an apparatus configured to capture the light beam reflected by the object in response to an illumination by the illumination light beam and to generate at least one measurement signal. In the context of the present disclosure, a "measurement signal" can be understood to mean in principle any signal, in particular an electrical signal, for example a voltage or a current, which was generated in accordance with the reflected, received light beam or using the reflected, received light beam.

The detector unit can be part of a localization unit. In the context of the present disclosure, a "localization unit" can be understood to mean in principle an arbitrary apparatus configured to generate at least one localization information item. The localization information item can be selected from at least one information item from the group consisting of: a measurement signal depending on the location of the retroreflector illuminated by the localization unit; an information item about the spacing of the retroreflector illuminated by the localization unit from the localization unit; an information item about a distance of the retroreflector illuminated by the localization unit from the localization unit; an information item about a relative position of the retroreflector illuminated by the localization unit with respect to the localization unit; and an information item about a length change. Further, the localization unit can have the at least one illumination unit. The localization unit can be configured to illuminate the object with the at least one illumination light beam. The localization unit can comprise at least one element selected from the group consisting of: a laser tracer; a laser tracker; a LIDAR sensor, with an FMCW-LIDAR sensor. The apparatus can have a plurality of localization units. The localization unit can have the at least one detector unit. In particular, the localization unit can have a composite of laser and camera.

In the context of the present disclosure, a "laser tracer" can be understood to mean, in principle, any measuring apparatus configured to determine a distance, in particular a change in distance, to the object by interferometry. The laser tracer can be configured to track a spatial position of the object at different times. The laser tracer can be configured to follow, with a laser beam, an object moving in space. The distance change can be measured incrementally. The laser tracer can be an incremental measuring system with a large field of view, in particular a large swivel range of a laser beam direction. By way of example, at least two successive measurements may be necessary to measure the change in distance. The laser tracer can cover a large angular range. By way of example, the laser beam of the laser tracer can be swivellable over a large angular range. In the context of the present disclosure, a "laser tracker" can be understood to mean, in principle, any measuring apparatus configured to determine a distance and/or direction to an object by interferometry, in particular relative to axes which are defined by an opto-mechanism of the laser tracker.

In the context of the present disclosure, a "LIDAR sensor" can be understood to mean, in principle, any apparatus that is based on the LIDAR ("light detection and ranging") measurement principle, which is also referred to as LADAR (laser detection and ranging). In particular, the LIDAR sensor can be configured to generate and receive a light beam, for example a laser beam, in particular the light beam previously emitted thereby and back-reflected thereto, and determine the distance between the LIDAR sensor and the retroreflector therefrom, for example by exploiting differences in the return times and wavelengths. With, the localization unit can have an FMCW-LIDAR sensor. Here, "FMCW" is an abbreviation for the expression "frequency modulated continuous wave". The FMCW-LIDAR sensor can be configured to generate the light beam, the frequency of which is continuously tuned according to the FMCW method. By way of example, the frequency of the light beam can be linearly modulated over time. In principle, a combination of LIDAR method and FMCW method is known to a person skilled in the art, for example from Chip-scale Lidar, Benham Behroozpur Baghmisheh, Technical Report No. UCB/EECS.2017-4. By way of example, the LIDAR unit can be configured like in U.S. Pat. No. 9,559,486 B2, U.S. Pat. No. 8,913,636 B2, or US 2016/123718 A1. FMCW-LIDAR sensors are more robust and cost-effective than laser tracers. Moreover, the FMCW-LIDAR sensors can be insensitive to so-called line-of-sight interruptions since these are absolute measuring systems.

The apparatus has the at least one evaluation and control unit. In the context of the present disclosure, an "evaluation and control unit" can be understood to mean, in principle, an apparatus configured to evaluate measurement signals generated by the detector unit and perform open-loop or closed-loop control for at least one component or process. By way of example, the evaluation and control unit can have at least one data processing apparatus, for example at least one computer or microcontroller. In particular, the evaluation and control unit can be embodied as a central control unit for the entire apparatus. However, alternatively a decentralized evaluation and control unit with a plurality of individual, cooperating constituent parts is also possible. Furthermore, the evaluation and control unit can have at least one user interface, for example at least one keyboard and/or at least one display.

Information items for specifying at least one adjustment parameter for setting the effective focal length of the beam expander optical unit and/or setting a spatial alignment of the beam deflection unit can be determined by way of an algorithmic evaluation of the measurement signal. The evaluation and control unit is configured to evaluate the measurement signal, the evaluation of the measurement signal comprising a determination of at least one information item in respect of the illumination of the object. The information item in respect of the illumination of the object can comprise at least one information item selected from the group consisting of: an information item in relation to a back-reflected intensity I, e.g., in the case of a retroreflector arrangement as an object a maximum back-reflected intensity: $\max \Sigma_i I_i$, where i is the number of retroreflectors with i=1 to N, a variance of the intensity var $I_i$, a minimum back-reflected intensity min min $\Sigma_i I_i$; a prediction of at least one object trajectory in space; a distance of the object from the detector unit; a number of back-reflected parts of the object, in particular a number of back-reflected retroreflectors; an information item in respect of a back-reflected region of an object; a signal-to-noise ratio; a speed of the object; an object position change over time; information items in respect of the inertia of the object; information items from additional sensor systems, for example an acceleration sensor or a robot trajectory. "Parts of the object" can be understood to mean regions and/or components of the object, in particular retroreflectors.

The evaluation and control unit is configured to determine the at least one manipulated variable for setting an effective focal length of the beam expander optical unit and/or for setting a spatial alignment of the beam deflection unit on the basis of the at least one information item in respect of the illumination of the object. A "manipulated variable" can be understood to mean an output variable of the evaluation and control unit for controlling the optical unit. For the purposes of controlling the optical unit, provision can be made of at least one data link between the evaluation and control unit and the optical unit. The manipulated variable can have an information item about at least one adjustment parameter for setting the effective focal length of the beam expander optical unit and/or the spatial alignment of the beam deflection unit.

The evaluation and control unit can be configured to use the information item in relation to the illumination of the object to determine whether part of the object is located outside of the illumination light beam. The evaluation and control unit can be configured to transmit at least one signal to the beam deflection unit should part of the object be located outside of the illumination light beam.

The evaluation and control unit can be configured to determine at least one manipulated variable for setting the effective focal length of the beam expander optical unit and/or for setting the spatial alignment of the beam deflection unit by comparing the measurement signal to a stored model, in particular a model stored in a data memory unit of the evaluation and control unit. By way of example, the evaluation and control unit can be configured to determine at least one manipulated variable for setting the effective focal length of the beam expander optical unit and/or for setting the spatial alignment of the beam deflection unit by comparing the information item in respect of the illumination of the object to at least one setpoint value. The evaluation and control unit can be configured to determine a deviation of the information item in respect of the illumination of the object from the setpoint value. The evaluation and control unit can be configured to transmit at least one signal to the beam deflection unit should a deviation be greater than or equal to a predetermined and/or predefined tolerance value. The evaluation and control unit can be configured to transmit the at least one signal comprising an information item about the manipulated variable to the beam expander optical unit and/or the beam deflection unit should the information item in respect of the illumination of the object be greater than or equal to a predetermined and/or predefined tolerance value.

The evaluation and control unit can be configured to determine the manipulated variable by control to at least one variable selected from the group consisting of: an information item in relation to a back-reflected intensity I, e.g., in the case of a retroreflector arrangement as an object a maximum back-reflected intensity: $\max \Sigma_i I_i$, where i is the number of the parts of the object with i=1 to N, a variance of the intensity var, a maximization of a minimum back-reflected intensity max min $\Sigma_i I_i$; a prediction of at least one object trajectory in space; a distance of the object from the detector unit; a number of back-reflected parts of the object; an information item in respect of a back-reflected region of an object; a signal-to-noise ratio, in particular a signal-to-noise ratio averaged over all retroreflectors; a speed of the object; physical reality; an external position information item; an object position change over time; information items in respect of the inertia of the object; information items from additional sensor systems, for example an acceleration sensor or a robot trajectory.

The at least one object trajectory in space can be predicted at different times using measurement by determining and evaluating at least two spatial coordinates, in particular mean spatial coordinates, of the object.

The control to physical plausibility may comprise a plausibility test with the assumption that the object cannot traverse an unrealistically large distance between two successive measurement points. By way of example, a distance of 0.1 m in the case of a data rate of 1 kHz or a distance of 1 m in the case of a data rate of 100 Hz can be assumed to be implausible; i.e., speeds above 100 m/s can be assumed to be implausible. Other speeds can also be assumed to be implausible, for example above 50 m/s, or 10 m/s.

The external position information item can be an external information item, i.e., an information item not determined by the apparatus itself. By way of example, the external position information item can be an information item of a robot trajectory.

The evaluation and control unit can be configured to determine a speed of the object from the measurement signal. The apparatus can be configured to determine a speed of a movement of the object, in particular of the retroreflectors. By way of example, the localization unit of the apparatus can be embodied as an FMCW-LIDAR sensor. The apparatus can be configured to determine a movement of the object by tracking the retroreflectors attached to the object. When measuring the distance of the retroreflectors from the localization unit, the speeds of the retroreflectors, in particular of the retroreflector ensemble, can be determinable instantaneously using the apparatus in the case of moving retroreflectors by way of exploiting the Doppler shift occurring in the case of the FMCW-LIDAR sensors. This can be of great advantage, particularly for closed-loop movement control of a machine. If the FMCW-LIDAR sensors are used as a localization unit, a signal in accordance with the movement of the retroreflectors can be generated directly.

The FMCW-LIDAR sensors could be advantageous in that the movement of an object is expressed directly as a signal. The movement of the retroreflector can lead to a Doppler shift of a beat frequency, the Doppler shift of the beat frequency being able to encode the distance to the retroreflector. The Doppler shift of the beat frequency can be present at all times. By way of example, it may be necessary to combine the Doppler shift of the beat frequency by calculation in order to be able to ascertain the distance to the retroreflector with the desired accuracy in the case of a moving retroreflector. An information item about a current speed of the retroreflector in the form of the Doppler shift of the beat frequency can be available at all times as a measurement signal and hence the speed of the retroreflector can be determinable instantaneously. In the case of measurement systems based on interferometry, the speed of the retroreflector can only be calculable from the spatial distance of two measurements spaced apart in time. As an alternative or in addition thereto, the apparatus can have at least one further measurement sensor system, for example at least one speed sensor, which is configured to determine the speed of the object.

The beam deflection unit can be configured to deflect the illumination light beam on the basis of the signal from the evaluation and control unit in such a way that the illumination light beam rotates over a defined object diameter in a manner offset by 20%, with 15%, particularly with 10% of its diameter. The detector unit can be configured to capture, for different rotational positions, respectively one reflected light beam generated by the object in response to the rotating illumination light beam. For the various rotational positions, the evaluation and control unit can be configured to respectively determine the information item in respect of the illumination of the object, to compare said information item to at least one setpoint value and to determine the respective deviation. The evaluation and control unit can be configured to determine the rotational position with the minimum deviation from the setpoint value. The evaluation and control unit can be configured to set the beam deflection unit to the rotational position with the minimum deviation.

The evaluation and control unit can be configured to transmit a signal to the beam expander optical unit to increase the effective focal length for the rotational position with the minimum deviation. In particular, this can be implemented before setting the beam deflection unit to the rotational position with the minimum deviation. The evaluation and control unit can be configured to determine the information item in respect of the illumination of the object post beam expansion and compare this to the setpoint value. In the case of correspondence of the information in respect of the illumination of the object with the setpoint value, the evaluation and control unit can transmit a signal to the beam deflection unit and can set the beam deflection unit to the rotational position with the minimum deviation.

By way of example, in response to the signal from the evaluation and control unit, the beam deflection unit can deflect the illumination light beam in such a way that the illumination light beam rotates over a defined object diameter in a manner offset by 20%, with 15%, particularly with 10% of its diameter. If more retroreflectors and/or object regions than previously are detected again in the process, the evaluation and control unit transmits at least one signal to the beam expander optical unit and the expansion is slightly increased. If all expected signals of the object are then detected, the beam deflection unit is adjusted by the corresponding value.

The evaluation and control unit can be configured to set the beam expander optical unit and/or the beam deflection unit in such a way that the illumination light beam illuminates a predefined object diameter at a location of the object with a tolerance of 20%, with 15%, particularly with 10%. If the object moves along any spatial curve with up to a typical maximal acceleration for the employed measurement system, the object can be tracked in such a way that ±10% of a defined object surface continue to be illuminated, independently of the fact whether the object is at a distance of 1 m or at a distance of up to 50 m, up to 100 m, up to 200 m or at a greater distance from the calculation origin of the distance measurement. Here, the expanded beam can be adjusted on the basis of the speed and acceleration of the tracked object. Thus, object speeds of up to 5 m/s and object accelerations of up to 20 m/s$^2$ can be tracked using an FMCW-LIDAR-based measurement system.

In a further aspect of the present disclosure, a coordinate measuring machine for measuring at least one workpiece is provided. The coordinate measuring machine comprises at least one apparatus as per one of the exemplary embodiments described further above or as per one of the exemplary embodiments yet to be explained below. Furthermore, the coordinate measuring machine has at least one active and/or passive sensor configured to probe the workpiece, the sensor having at least one object. In the context of the present disclosure, a "coordinate measuring machine" can be understood to mean, in principle, any apparatus configured to capture or determine at least one spatial coordinate of an object, for example an x-, y-, or z-coordinate of a Cartesian coordinate system or a spherical coordinate of a spherical coordinate system. In the context of the present disclosure, "measuring" an object can be understood to mean determining, deriving and/or registering at least one property of the object. In particular, the property can be a distance of the object from the measurement object and/or a position, relative position or attitude of the object in space or relative to the measurement object. Further, the property can also be a condition, for example a surface condition. In the context of the present disclosure, a "workpiece" can be understood to mean, in principle, any object, the measurement of which is required or desirable, for example within the scope of a work process, in particular for aligning the object. In the context of the present disclosure, "probing" of the workpiece can mean, in principle, an interaction between the measurement object and the workpiece. By way of example, this can relate to tactile probing or optical scanning. Equally, the interaction between the measurement object and the workpiece can also relate to processing or a general modification and/or manipulation, for example a CNC-controlled precision processing or joining and/or assembly step.

In a further aspect of the present disclosure, a method for adjusting at least one beam path for tracking at least one object is provided. In the method, use is made of an apparatus as per one of the exemplary embodiments described further above or as per one of the exemplary embodiments yet to be explained below. The method comprises the following steps:

i) generating at least one illumination light beam by way of at least one illumination unit;

ii) divergently expanding the illumination light beam using at least one beam expander optical unit of at least one optical unit;

iii) spatially deflecting the illumination light beam about at least two different axes of rotation using at least one beam deflection unit of the optical unit;

iv) capturing a light beam reflected by the object in response to an illumination by the illumination light beam using at least one detector unit and generating at least one measurement signal;

v) evaluating the measurement signal using at least one evaluation and control unit, the evaluation of the measurement signal comprising a determination of at least one information item in respect of the illumination of the object;

vi) determining at least one manipulated variable for setting an effective focal length of the beam expander optical unit and/or for setting a spatial alignment of the beam deflection unit on the basis of the at least one information item in respect of the illumination of the object;

vii) adapting the effective focal length of the beam expander optical unit and/or the spatial alignment of the beam deflection unit on the basis of the manipulated variable.

With regard to exemplary embodiments and definitions, reference can be made to the above description of the apparatus and of the coordinate measuring machine. The method steps can be carried out in the order indicated, wherein one or more of the steps can at least in part also be carried out simultaneously and wherein one or more steps can be repeated multiply. Furthermore, further steps can additionally be performed independently of whether or not they are mentioned in the present application.

Further, a computer program is provided in the context of the present disclosure, said computer program, when executed on a computer or computer network, carrying out at least steps v) to vii) of the method for measuring the measurement object in one of its configurations.

Furthermore, in the context of the present disclosure, a computer program comprising program code means is provided for carrying out at least steps v) to vii) of the method according to the disclosure in one of its configurations when the program is executed on a computer or computer network. In particular, the program code means can be stored on a computer-readable data medium.

Furthermore, in the context of the present disclosure, a computer program product comprising program code means stored on a machine-readable medium is provided for carrying out at least steps v) to vii) of the method according to the disclosure in one of its configurations when the program is executed on a computer or computer network.

The apparatuses according to an aspect of the disclosure, in particular the apparatus, the coordinate measuring machine, and the method according to an aspect of the disclosure have numerous advantages over known apparatuses and methods. The apparatuses according to an aspect of the disclosure and the method according to an aspect of the disclosure allow a moving object to be tracked with great accuracy. In the process, precise characteristics of the system such as focal length or angle settings need not be known exactly. It is sufficient to specify a value only in programming terms without monitoring this actual position. The apparatuses according to an aspect of the disclosure, in particular the apparatus, the coordinate measuring machine, and the method according to an aspect of the disclosure allow the object to be illuminated in the tolerance range of 20%, with 15%, particularly with ±10%.

In summary, in the context of the present disclosure, the following exemplary embodiments are provided:

Exemplary embodiment 1: An apparatus for adjusting at least one beam path for tracking at least one object, the apparatus comprising:

at least one illumination unit configured to generate at least one illumination light beam;

at least one optical unit, the optical unit having at least one beam expander optical unit and at least one beam deflection unit, the beam expander optical unit being configured to divergently expand the illumination light beam and the beam deflection unit being configured to deflect the illumination light beam spatially about at least two different axes of rotation;

at least one detector unit configured to capture a light beam reflected by the object in response to an illumination by the illumination light beam and to generate at least one measurement signal, at least one evaluation and control unit configured to evaluate the measurement signal, evaluating the measurement signal comprising a determination of at least one information item in respect of the illumination of the object, the evaluation and control unit being configured to determine at least one manipulated variable for setting an effective focal length of the beam expander optical unit and/or for setting a spatial alignment of the beam deflection unit on the basis of the at least one information item in respect of the illumination of the object.

Exemplary embodiment 2: The apparatus according to the preceding exemplary embodiment, wherein the evaluation and control unit is configured to set the beam expander optical unit and/or the beam deflection unit in such a way that the illumination light beam illuminates a predefined object diameter at a location of the object with a tolerance of 20%, with ±15%, particularly with 10%.

Exemplary embodiment 3: The apparatus according to either of the preceding exemplary embodiments, wherein the evaluation and control unit is configured to determine the manipulated variable by comparing the information item in respect of the illumination of the object to at least one setpoint value and to adapt the effective focal length of the beam expander optical unit and/or the spatial alignment of the beam deflection unit on the basis of the manipulated variable.

Exemplary embodiment 4: The apparatus according to any one of the preceding exemplary embodiments, wherein the evaluation and control unit is configured to determine the manipulated variable by control to at least one variable selected from the group consisting of: an information item in relation to a back-reflected intensity I, e.g., in the case of a retroreflector arrangement as an object a maximum back-reflected intensity: max $\Sigma_i I_i$, where i is the number of parts of the object with i=1 to N, a variance of the intensity var, a maximization of a minimum back-reflected intensity max min $\Sigma_i I_i$; a prediction of at least one object trajectory in space; a distance of the object from the detector unit; a number of back-reflected parts of the object; an information item in respect of a back-reflected region of an object; a signal-to-noise ratio; a speed of the object; physical reality; an external position information item; an object position change over time; information items in respect of the inertia of the object; information items from additional sensor systems.

Exemplary embodiment 5: The apparatus according to any one of the preceding exemplary embodiments, wherein the optical unit has at least one collimation optical unit and at least one energy redistribution optical unit which are configured to generate a homogeneously distributed illumination of the object.

Exemplary embodiment 6: The apparatus according to any one of the preceding exemplary embodiments, wherein the beam expander optical unit is configured to continuously or incrementally expand the illumination light beam.

Exemplary embodiment 7: The apparatus according to any one of the preceding exemplary embodiments, wherein the beam deflection unit is configured to deflect the illumination light beam through at least two angles in a measurement space, the apparatus being configured to move the optical unit through these two angles about the at least two axes of rotation.

Exemplary embodiment 8: The apparatus according to any one of the preceding exemplary embodiments, wherein the beam deflection unit has at least one mirror configured to deflect the illumination light beam, the beam deflection unit having a mirror configured to deflect the illumination light beam spatially about the two different axes of rotation or the beam deflection unit having at least one first mirror and at least one second mirror, the first mirror being configured to spatially deflect the illumination light beam about a first axis of rotation and the second mirror being configured to deflect the illumination light beam spatially about a second axis of rotation.

Exemplary embodiment 9: The apparatus according to any one of the preceding exemplary embodiments, wherein the information item in respect of the illumination of the object comprises at least one information item selected from the group consisting of: an information item in relation to a back-reflected intensity I, e.g., in the case of a retroreflector arrangement as an object a maximum back-reflected intensity: max $\Sigma_i I_i$, where i is the number of parts of the object with i=1 to N, a variance of the intensity var, a minimum back-reflected intensity min $\Sigma_i I_i$; a prediction of at least one object trajectory in space; a distance of the object from the detector unit; a number of back-reflected parts of the object; an information item in respect of a back-reflected region of an object; a signal-to-noise ratio; a speed of the object; an object position change over time; information items in respect of the inertia of the object; information items from additional sensor systems.

Exemplary embodiment 10: The apparatus according to any one of the preceding exemplary embodiments, wherein the evaluation and control unit is configured to determine whether part of the object is located outside of the illumination light beam from the information item in respect of the illumination of the object, the evaluation and control unit being configured to transmit at least one signal to the beam deflection unit should part of the object be located outside of the illumination light beam.

Exemplary embodiment 11: The apparatus according to the preceding exemplary embodiment, wherein the beam deflection unit is configured to deflect the illumination light beam on the basis of the signal from the evaluation and control unit in such a way that the illumination light beam rotates over a defined object diameter in a manner offset by 20%, with 15%, particularly with 10% of its diameter.

Exemplary embodiment 12: The apparatus according to the preceding exemplary embodiment, wherein the detector unit is configured to capture respectively one reflected light beam generated by the object in response to the rotated illumination light beam for different rotational positions, the evaluation and control unit being configured, for the various rotational positions, to respectively determine the information item in respect of the illumination of the object, compare the latter to at least one setpoint value and determine the respective deviation, the evaluation and control unit being configured to determine the rotational position with the minimum deviation from the setpoint value and the evaluation and control unit being configured to set the beam deflection unit to the rotational position with the minimum deviation.

Exemplary embodiment 13: The apparatus according to the preceding exemplary embodiment, wherein the evaluation and control unit is configured to transmit a signal to the beam expander optical unit in order to increase the effective focal length.

Exemplary embodiment 14: The apparatus according to any one of the preceding exemplary embodiments, wherein the detector unit and/or the illumination unit is embodied as a localization unit, the localization unit comprising at least one element selected from the group consisting of: a laser tracer, a laser tracker, a LIDAR sensor, with an FMCW-LIDAR sensor.

Exemplary embodiment 15: The apparatus according to any one of the preceding exemplary embodiments, wherein the apparatus is configured to determine a speed of the object.

Exemplary embodiment 16: A coordinate measuring machine for measuring at least one workpiece, wherein the coordinate measuring machine comprises at least one apparatus according to any one of the preceding exemplary embodiments relating to an apparatus, the coordinate measuring machine having at least one active and/or passive sensor configured to probe the workpiece, the sensor having at least one object.

Exemplary embodiment 17: A method for adjusting at least one beam path for tracking at least one object, wherein an apparatus according to any one of the preceding exemplary embodiments relating to an apparatus is used in the method, the method including the following steps:
  i) generating at least one illumination light beam by way of at least one illumination unit;
  ii) divergently expanding the illumination light beam using at least one beam expander optical unit of at least one optical unit;
  iii) spatially deflecting the illumination light beam about at least two different axes of rotation using at least one beam deflection unit of the optical unit;
  iv) capturing a light beam reflected by the object in response to an illumination by the illumination light beam using at least one detector unit and generating at least one measurement signal;
  v) evaluating the measurement signal using at least one evaluation and control unit, the evaluation of the measurement signal comprising a determination of at least one information item in respect of the illumination of the object;
  vi) determining at least one manipulated variable for setting an effective focal length of the beam expander optical unit and/or for setting a spatial alignment of the beam deflection unit on the basis of the at least one information item in respect of the illumination of the object;
  vii) adapting the effective focal length of the beam expander optical unit and/or the spatial alignment of the beam deflection unit on the basis of the manipulated variable.

Exemplary embodiment 18: A computer program which, when executed on a computer or computer network, carries out the method according to the preceding exemplary embodiment relating to a method, in particular method steps v) to vii), in one of its configurations.

Exemplary embodiment 19: A computer program product comprising program code means stored on a machine-readable medium for carrying out the method according to the exemplary embodiment 16 when the program is executed on a computer or computer network.

BRIEF DESCRIPTION OF THE DRAWINGS

The disclosure will now be described with reference to the drawings wherein.

DESCRIPTION OF EXEMPLARY EMBODIMENTS

Figure 1A:
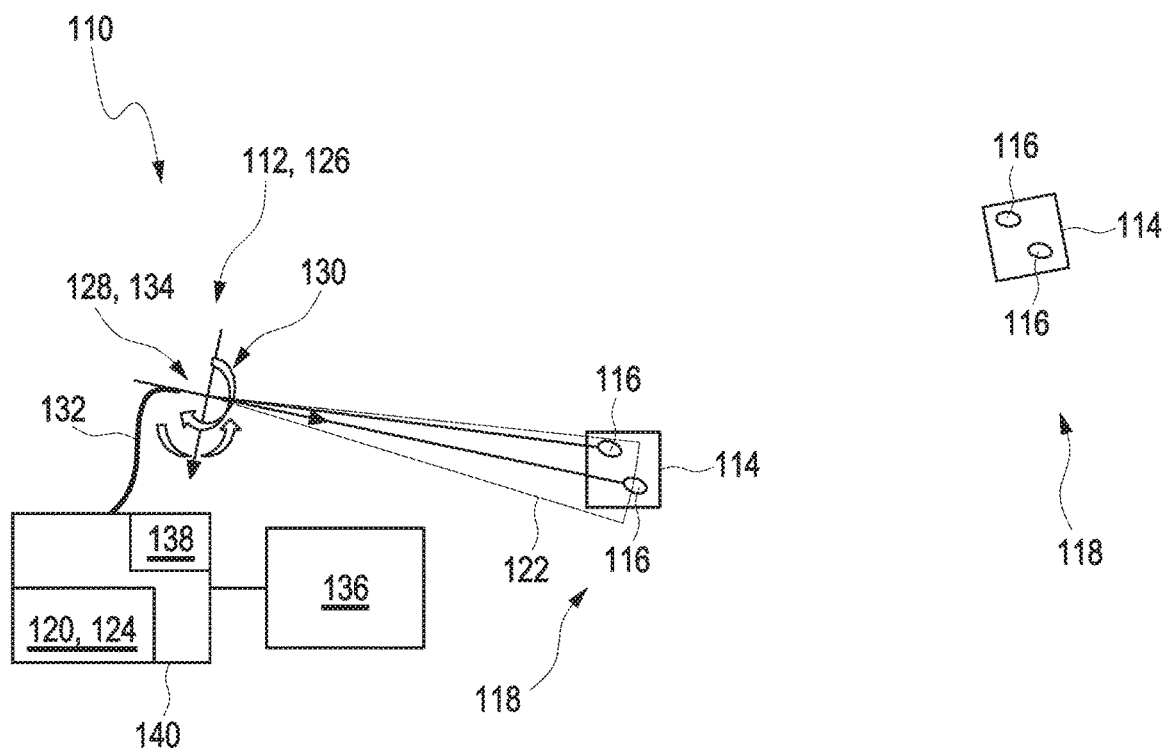
FIGS. 1A and 1B show a schematic illustration of an apparatus for tracking an object at different spatial positions according to an exemplary embodiment of the disclosure.
Figure 1B:
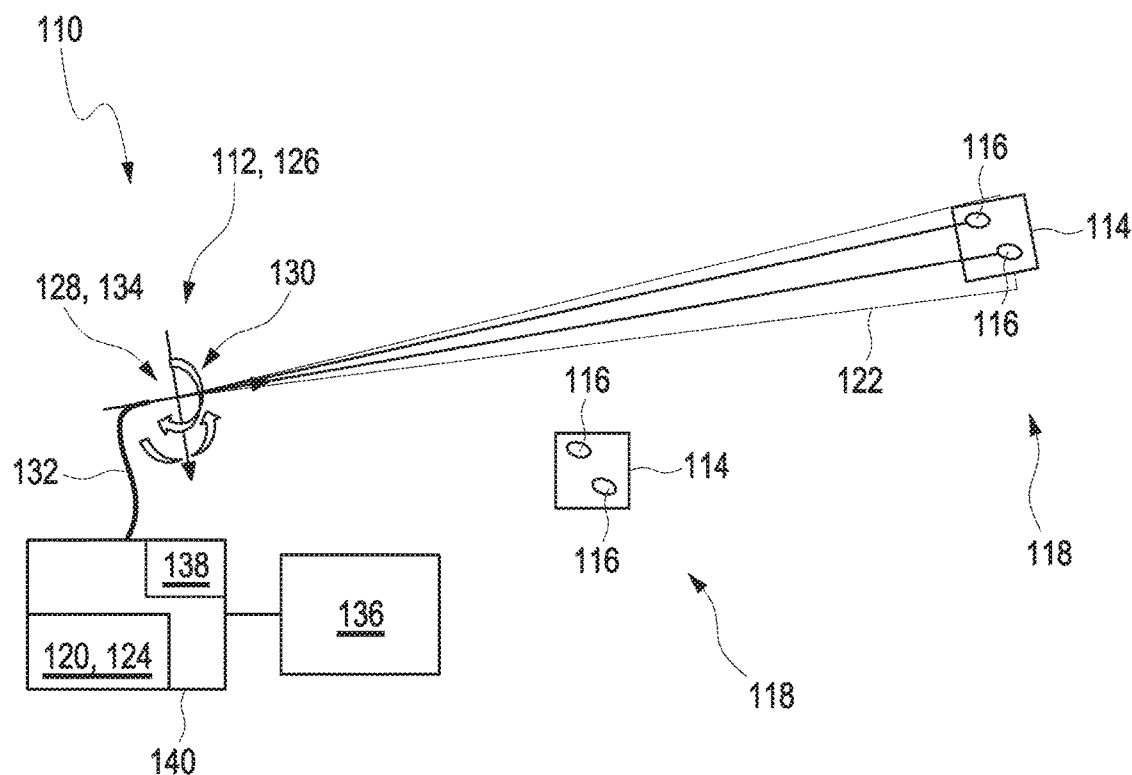

Further details and features of the disclosure will become apparent from the following description of exemplary embodiments. The respective features can be realized by themselves or as a plurality in combination with one another. The disclosure is not restricted to the exemplary embodiments. The exemplary embodiments are illustrated schematically in the figures. Identical reference numerals in the individual figures designate identical or functionally identical elements or elements corresponding to one another with regard to their functions.

FIG. 1A shows a schematic illustration of an exemplary embodiment of an apparatus 110 for adjusting at least one beam path 112 for tracking at least one object 114. The object 114 can be configured to reflect an incident light beam. By way of example, the object 114 can be and/or can have a retroreflector 116. The object 114 can be and/or can have an arrangement of a plurality of retroreflectors 116. By way of example, the retroreflector 116 can be a marker. By way of example, the retroreflector 116 can be selected from the group consisting of: a cat's eye; a cat's eye with a reflection layer; a spherical lens with a reflection layer; a marker as described in US 2011/0007326 A1, US 2013/0050410 A1, or US 2017/0258531 A1, the content of which is herewith incorporated into this application, a cube prism, and a corner cube. By way of example, the retroreflector 116 can be arranged on a measuring head of a sensor or a tool, with which a component can be probed. Reflectors 116 located on a spherical shell 118 are measured with the same distance.

The apparatus 110 comprises at least one illumination unit 120 configured to generate at least one illumination light beam 122. The illumination unit 120 can have a light source 124, in particular a laser source.

The apparatus 110 further comprises at least one optical unit 126. The optical unit 126 has at least one beam expander optical unit 128 and at least one beam deflection unit 130. The illumination unit 120 can have at least one optical fiber 132 configured to guide the light beam generated by the light source 124 to the optical unit 126.

The beam expander optical unit 128 is configured to divergently expand the illumination light beam 122. The beam expander optical unit 128 can be configured to continuously or incrementally expand the illumination light beam 122. By way of example, the beam expander optical unit 128 can have at least a lens and/or a lens system, illustrated as lens 134 in the figures by way of example, comprising a plurality of lenses. By way of example, the beam expander optical unit 128 can have at least one diverging lens. The beam expander optical unit 128 can have at least one lens with a negative focal length. The beam expander optical unit 128, in particular the lens system, can have an adjustable and/or controllable and/or adaptable effective focal length. By way of example, the effective focal length can be adjusted and/or adapted by altering a position of at least one lens in the lens system. The beam expander optical unit 128 can be connected to an evaluation and control unit 136 of the apparatus 110, for example via an electronic link, said evaluation and control unit being configured to control and/or adapt the beam expander optical unit 128, in particular to set the position of the lenses in the lens system.

The beam deflection unit 130 is configured to spatially deflect the illumination light beam 122 about at least two different axes of rotation. The beam deflection unit 130 can change the propagation direction of the illumination light beam 122 about at least two different and, in principle, arbitrary axes, in particular deflect said direction through at least two angles. The axes of rotation can extend perpendicular to the propagation direction of the illumination light beam 122. The beam deflection unit 130 can be configured to deflect the illumination light beam 122 through at least two angles in a measuring space. Adjusting can be implemented in a coordinate system, for example a Cartesian coordinate system or a spherical coordinate system. Other coordinate systems are also conceivable. An origin or zero of the coordinate system can be at a point of the apparatus. By way of example, the illumination light beam 122 can propagate along a z-axis and the axes of rotation can be the x-axis and a further axis, for example a y-axis. A deflection of the illumination light beam 122 from its original propagation direction can be implemented, for example, through two angles relative to these axes. By way of example, a deflection and/or displacement about the two axes can be implemented perpendicular to the chief ray in the basic alignment. Here, the chief ray in the basic alignment can be directed to a measurement volume center. However, other axes of rotation are also conceivable. By way of example, the apparatus 110 can be configured to move the optical unit 126 through two angles about the at least two axes of rotation. As an alternative or in addition thereto, the beam deflection unit 130 can have at least one mirror configured to deflect the illumination light beam 122. By way of example, the beam deflection unit 130 can have exactly one mirror configured to deflect the illumination light beam 122 spatially about the two different axes of rotation. By way of example, the mirror can be embodied as a microelectromechanical system (MEMS) mirror. Alternatively, the beam deflection unit 130 can have at least one first and at least one second mirror, the first mirror being configured to deflect the illumination light beam 122 spatially about a first axis of rotation and the second mirror being configured to deflect the illumination light beam 122 spatially about a second axis of rotation. By way of example, a galvanometer scanner can be provided as a drive for the mirrors.

The optical unit 126 can have at least one collimation optical unit and at least one energy redistribution optical unit, not illustrated here, which are configured to generate a homogeneously distributed illumination of the object. By way of example, the collimation optical unit can have at least one lens configured to shape a collimated beam from a divergent beam at the distance of the effective focal length of said lens. By way of example, the energy redistribution optical unit can have at least one composite made of an aspherical lens pair configured to generate an energy distribution that is homogeneous over the beam cross section from a Gaussian distribution. A combination can be configured to generate a collimated, homogeneously distributed illumination.

The apparatus 110 comprises at least one detector unit 138 configured to capture a light beam reflected by the object 114 in response to an illumination by the illumination light beam 122 and to generate at least one measurement signal. The detector unit 138 can be part of a localization unit 140. The localization unit 140 can be configured to generate at least one localization information item. The localization information item can be selected from at least one information item from the group consisting of: a measurement signal depending on the location of the retroreflector 116 illuminated by the localization unit 140; an information item about the spacing of the retroreflector 116 illuminated by the localization unit 140 from the localization unit 140; an information item about a distance of the retroreflector 116 illuminated by the localization unit 140 from the localization unit 140; an information item about a relative position of the retroreflector 116 illuminated by the localization unit 140 with respect to the localization unit 140; and an information item about a length change. Further, the localization unit 140 can have the at least one illumination unit 120. The localization unit 140 can be configured to illuminate the object 114 with the at least one illumination light beam 122. The localization unit 140 can comprise at least one element selected from the group consisting of: a laser tracer; a laser tracker; a LIDAR sensor, with an FMCW-LIDAR sensor. The apparatus 110 can have a plurality of localization units 140.

By way of example, the localization unit 140 can be embodied as a LIDAR sensor. In particular, the LIDAR sensor can be configured to generate and receive a light beam, for example a laser beam, in particular the light beam previously emitted thereby and back-reflected thereto, and determine the distance between the LIDAR sensor and the retroreflector 116 therefrom, for example by exploiting differences in the return times and wavelengths. With, the localization unit can have an FMCW-LIDAR sensor. The FMCW-LIDAR sensor can be configured to generate the light beam, the frequency of which is continuously tuned according to the FMCW method. By way of example, the frequency of the light beam can be linearly modulated over time. In principle, a combination of LIDAR method and FMCW method is known to a person skilled in the art, for example from Chip-scale Lidar, Benham Behroozpur Baghmisheh, Technical Report No. UCB/EECS.2017-4. By way of example, the LIDAR unit can be configured like in U.S. Pat. No. 9,559,486 B2, U.S. Pat. No. 8,913,636 B2, or US 2016/123718 A1.

The apparatus has the at least one evaluation and control unit 136. The evaluation and control unit 136 is configured to evaluate measurement signals generated by the detector unit 138 and to perform open-loop or closed-loop control for at least one component or process. By way of example, the evaluation and control unit 136 can have at least one data processing apparatus, for example at least one computer or microcontroller. In particular, the evaluation and control unit 136 can be embodied as a central control unit for the entire apparatus. However, a decentralized evaluation and control unit 136 with a plurality of individual, cooperating constituent parts is also alternatively possible. Furthermore, the evaluation and control unit 136 can have at least one user interface, for example at least one keyboard and/or at least one display.

Information items for specifying at least one adjustment parameter for setting the effective focal length of the beam expander optical unit 128 and/or setting a spatial alignment of the beam deflection unit 130 can be determined by way of an algorithmic evaluation of the measurement signal. The evaluation and control unit 136 is configured to evaluate the measurement signal, the evaluation of the measurement signal comprising a determination of at least one information item in respect of the illumination of the object 114. The information item in respect of the illumination of the object 114 can comprise at least one information item selected from the group consisting of: an information item in relation to a back-reflected intensity I, e.g., in the case of a retroreflector arrangement as an object 114 a maximum back-reflected intensity: max $\Sigma_i I_i$, where i is the number of retroreflectors 116 with i=1 to N, a variance of the intensity var $I_i$, a minimum back-reflected intensity min $\Sigma_i I_i$; a prediction of at least one object trajectory in space; a distance of the object 114 from the detector unit 138; a number of back-reflected parts of the object 114, in particular a number of back-reflected retroreflectors 116; an information item in respect of a back-reflected region of an object 114; a signal-to-noise ratio; a speed of the object 114; an object position change over time; information items in respect of the inertia of the object 114; information items from additional sensor systems, for example an acceleration sensor or a robot trajectory.

The evaluation and control unit 136 is configured to determine the at least one manipulated variable for setting an effective focal length of the beam expander optical unit 128 and/or for setting a spatial alignment of the beam deflection unit 130 on the basis of the at least one information item in respect of the illumination of the object 114. For the purposes of controlling the optical unit 126, provision can be made of at least one data link between the evaluation and control unit 136 and the optical unit 126. The manipulated variable can have an information item about at least one adjustment parameter for setting the effective focal length of the beam expander optical unit 128 and/or the spatial alignment of the beam deflection unit 130.

The evaluation and control unit 136 can be configured to use the information item in relation to the illumination of the object 114 to determine whether part of the object 114 is located outside of the illumination light beam 122. The evaluation and control unit 136 can be configured to transmit at least one signal to the beam deflection unit 130 should part of the object 114 be located outside of the illumination light beam 122.

The evaluation and control unit 136 can be configured to determine the at least one manipulated variable for setting the effective focal length of the beam expander optical unit 128 and/or for setting the spatial alignment of the beam deflection unit 130 by comparing the measurement signal to a stored model, in particular a model stored in a data memory unit of the evaluation and control unit 136. By way of example, the evaluation and control unit 136 can be configured to determine the at least one manipulated variable for setting the effective focal length of the beam expander optical unit 128 and/or for setting the spatial alignment of the beam deflection unit 130 by comparing the information item in respect of the illumination of the object 114 to at least one setpoint value. The evaluation and control unit 136 can be configured to determine a deviation of the information item in respect of the illumination of the object 114 from the setpoint value. The evaluation and control unit 136 can be configured to transmit at least one signal to the beam deflection unit 130 should a deviation be greater than or equal to a predetermined and/or predefined tolerance value. The evaluation and control unit 136 can be configured to transmit the at least one signal comprising an information item about the manipulated variable to the beam expander optical unit 128 and/or the beam deflection unit 130 should the information item in respect of the illumination of the object 114 be greater than or equal to a predetermined and/or predefined tolerance value.

The evaluation and control unit 136 can be configured to determine the manipulated variable by control to at least one variable selected from the group consisting of: an information item in relation to a back-reflected intensity I, e.g., in the case of a retroreflector arrangement as an object 114 a maximum back-reflected intensity: $\max \Sigma_i I_i$, where i is the number of the parts of the object 114 with i=1 to N, a variance of the intensity var, a maximization of a minimum back-reflected intensity $\max \min \Sigma_i I_i$; a prediction of at least one object trajectory in space; a distance of the object 114 from the detector unit 138; a number of back-reflected parts of the object 114; an information item in respect of a back-reflected region of an object 114; a signal-to-noise ratio, in particular a signal-to-noise ratio averaged over all retroreflectors 116; a speed of the object 114; physical reality; an external position information item; an object position change over time; information items in respect of the inertia of the object 114; information items from additional sensor systems, for example an acceleration sensor or a robot trajectory.

The at least one object trajectory in space can be predicted at different times using measurement by determining and evaluating at least two spatial coordinates, in particular mean spatial coordinates, of the object 114.

The control to physical plausibility may comprise a plausibility test with the assumption that the object 114 cannot traverse an unrealistically large distance between two successive measurement points. By way of example, a distance of 0.1 m in the case of a data rate of 1 kHz or a distance of 1 m in the case of a data rate of 100 Hz can be assumed to be implausible; i.e., speeds above 100 m/s can be assumed to be implausible. Other speeds can also be assumed to be implausible, for example above 50 m/s, or 10 m/s.

The external position information item can be an external information item, i.e., an information item not determined by the apparatus 110 itself. By way of example, the external position information item can be an information item of a robot trajectory.

The evaluation and control unit 136 can be configured to determine a speed of the object 114 from the measurement signal. The apparatus 110 can be configured to determine a speed of a movement of the object 114, in particular of the retroreflectors 116. By way of example, the localization unit 140 of the apparatus 110 can be embodied as an FMCW-LIDAR sensor. The apparatus 110 can be configured to determine a movement of the object 114 by tracking the retroreflectors 116 attached to the object 114. When measuring the distance of the retroreflectors 116 from the localization unit 140, the speeds of the retroreflectors 116, in particular of the retroreflector ensemble, can be determinable instantaneously using the apparatus 110 in the case of moving retroreflectors 116 by way of exploiting the Doppler shift occurring in the case of the FMCW-LIDAR sensors. This can be of great advantage, particularly for closed-loop movement control of a machine. If the FMCW-LIDAR sensors are used as a localization unit 140, a signal in accordance with the movement of the retroreflectors 116 can be generated directly. The FMCW-LIDAR sensors could be advantageous in that the movement of an object 114 is expressed directly as a signal. The movement of the retroreflector 116 can lead to a Doppler shift of a beat frequency, the Doppler shift of the beat frequency being able to encode the distance to the retroreflector 116. The Doppler shift of the beat frequency can be present at all times. By way of example, it may be necessary to combine the Doppler shift of the beat frequency by calculation in order to be able to ascertain the distance to the retroreflector 116 with the desired accuracy in the case of a moving retroreflector 116. An information item about a current speed of the retroreflector 116 in the form of the Doppler shift of the beat frequency can be available at all times as a measurement signal and hence the speed of the retroreflector can be determinable instantaneously. In the case of measurement systems based on interferometry, the speed of the retroreflector 116 can only be calculable from the spatial distance of two measurements spaced apart in time. As an alternative or in addition thereto, the apparatus 110 can have at least one further measurement sensor system, for example at least one speed sensor, which is configured to determine the speed of the object 114.

The beam deflection unit 130 can be configured to deflect the illumination light beam 122 on the basis of the signal from the evaluation and control unit 136 in such a way that the illumination light beam 122 rotates over a defined object diameter in a manner offset by 20%, with 15%, particularly with 10% of its diameter. The detector unit 138 can be configured to capture, for different rotational positions, respectively one reflected light beam generated by the object 114 in response to the rotating illumination light beam. For the various rotational positions, the evaluation and control unit 136 can be configured to respectively determine the information item in respect of the illumination of the object 114, to compare said information item to at least one setpoint value and to determine the respective deviation. The evaluation and control unit 136 can be configured to determine the rotational position with the minimum deviation from the setpoint value. The evaluation and control unit 136 can be configured to set the beam deflection unit 130 to the rotational position with the minimum deviation.

The evaluation and control unit 136 can be configured to transmit a signal to the beam expander optical unit 128 to increase the effective focal length for the rotational position with the minimum deviation. In particular, this can be implemented before setting the beam deflection unit 130 to the rotational position with the minimum deviation. The evaluation and control unit 136 can be configured to determine the information item in respect of the illumination of the object 114 post beam expansion and compare this to the setpoint value. In the case of correspondence of the information item in respect of the illumination of the object 114 with the setpoint value, the evaluation and control unit 136 can transmit a signal to the beam deflection unit 130 and can set the beam deflection unit 130 to the rotational position with the minimum deviation.

By way of example, in response to the signal from the evaluation and control unit 136, the beam deflection unit 130 can deflect the illumination light beam 122 in such a way that the illumination light beam 122 rotates over a defined object diameter in a manner offset by 20%, with 15%, particularly with 10% of its diameter. If more retroreflectors 116 and/or object regions than previously are detected again in the process, the evaluation and control unit 136 transmits at least one signal to the beam expander optical unit 128 and the expansion is slightly increased. If all expected signals of the object 114 are then detected, the beam deflection unit 130 is adjusted by the corresponding value.

The evaluation and control unit 136 can be configured to set the beam expander optical unit 128 and/or the beam deflection unit 130 in such a way that the illumination light beam 122 illuminates a predefined object diameter at a location of the object 114 with a tolerance of 20%, with 15%, particularly with 10%. If the object 114 moves along any spatial curve with up to a typical maximal acceleration for the employed measurement system, the object 114 can be tracked in such a way that 10% of a defined object surface continue to be illuminated, independently of the fact whether the object 114 is at a distance of 1 m or at a distance of up to 50 m from the calculation origin of the distance measurement. Here, the expanded beam can be adjusted on the basis of the speed and acceleration of the tracked object 114. Thus, object speeds of up to 5 m/s and object accelerations of up to 20 m/s2 can be tracked with an FMCW-LIDAR-based measurement system.

Figure 2:
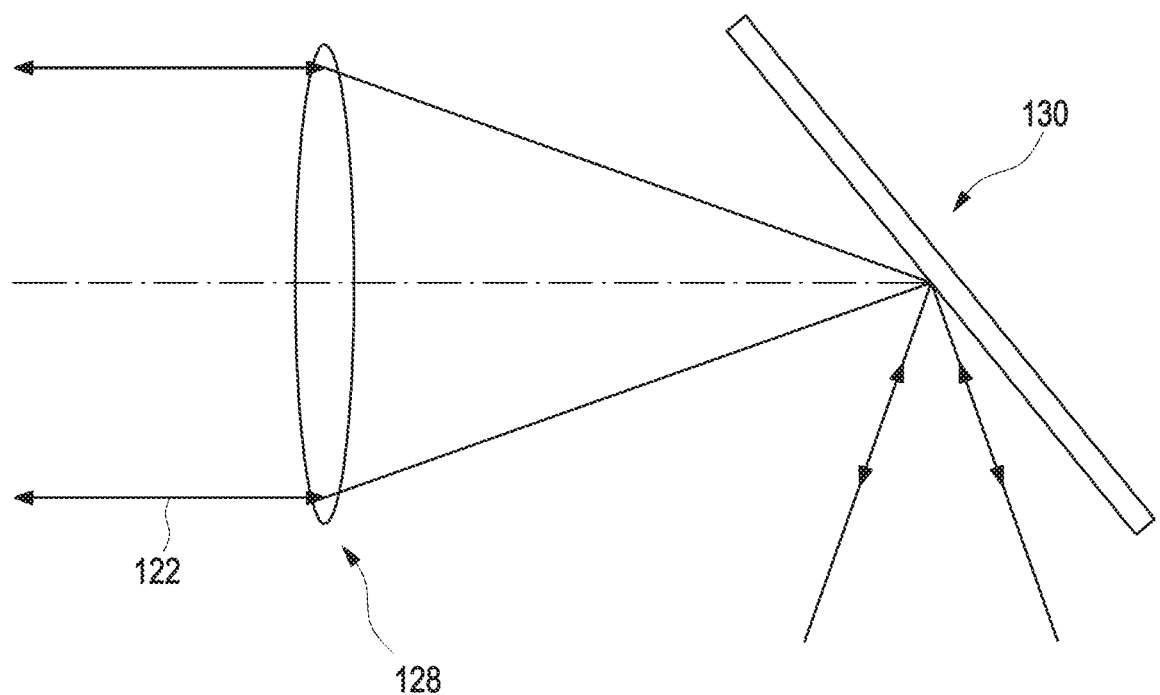
FIG. 2 shows a schematic illustration of an optical unit according to an exemplary embodiment of the disclosure.

FIG. 2 shows an exemplary embodiment of an optical unit 126. As shown in FIG. 2, the optical unit 126 has the beam expander optical unit 128 with an adjustable effective focal length and the beam deflection unit 130, which is configured to deflect the illumination light beam 122 in two directions perpendicular to the beam propagation. FIG. 2 shows a deflection in one plane.

Figure 3A:
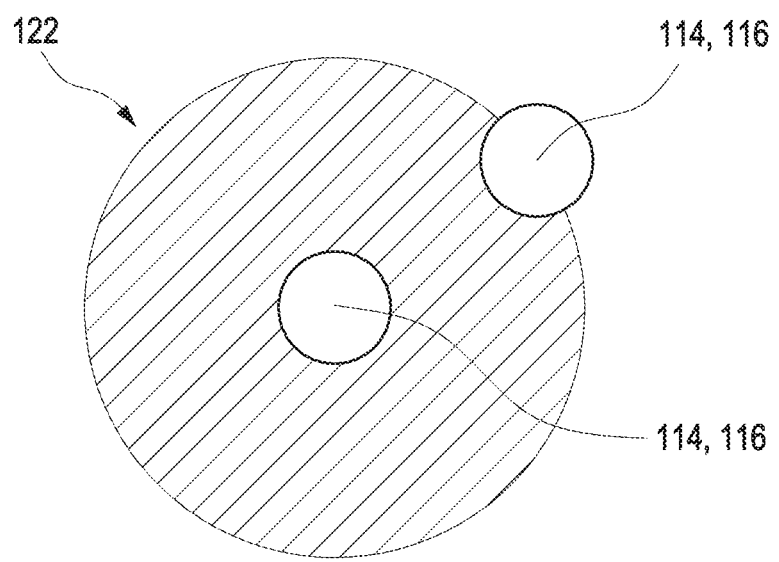
FIGS. 3A to 3C show a schematic illustration of a method according to an exemplary embodiment of the disclosure.
Figure 3B:
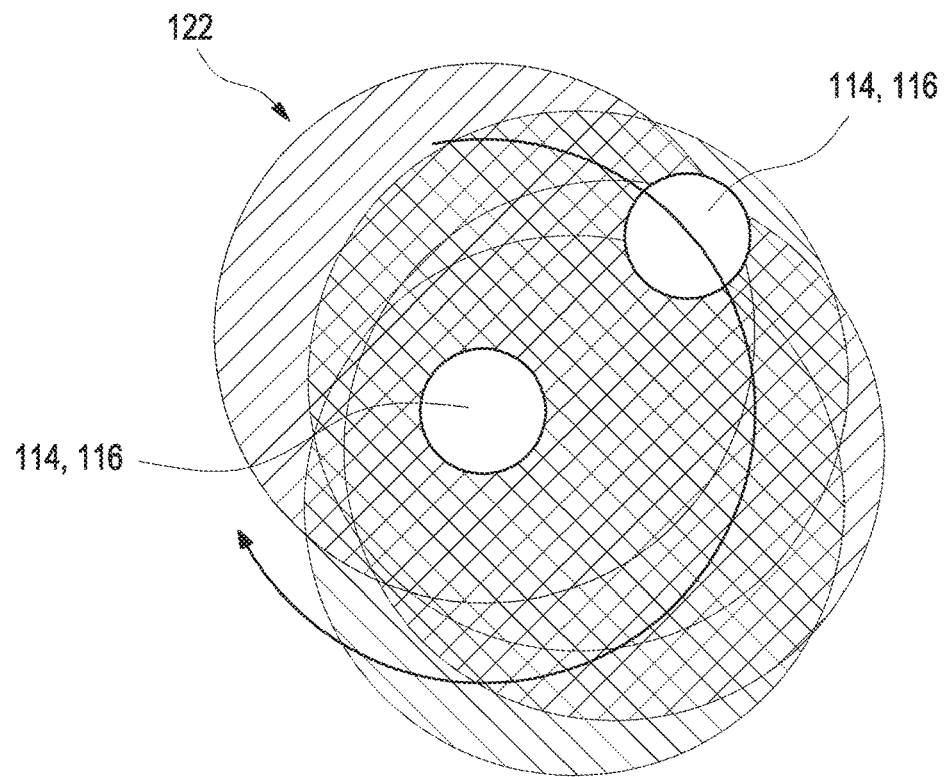
Figure 3C:
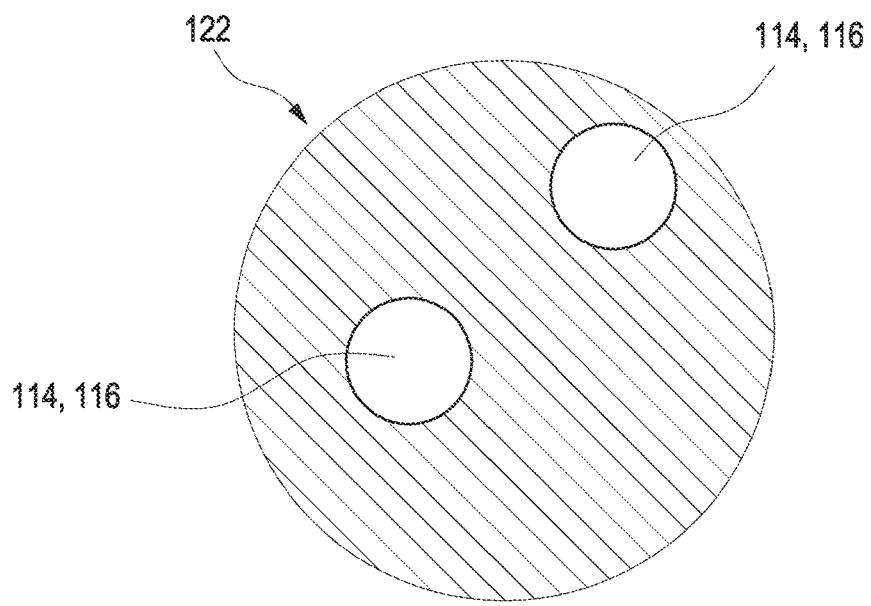

FIGS. 3A to 3C show an exemplary embodiment of adjusting according to the disclosure. FIG. 3A shows an initial situation, in which the expanded illumination light beam 122 does not illuminate part of the object 114, in particular one of the retroreflectors 116. The detector unit 138 captures a light beam reflected by the object 114 in response to the illumination by the illumination light beam 122 and generates the at least one measurement signal. The evaluation and control unit 136 evaluates the measurement signal and determines the at least one information item in respect of the illumination of the object 114. The evaluation and control unit 136 can use the information item in relation to the illumination of the object 114 to determine whether part of the object 114 is located outside of the illumination light beam 122. In this case, the evaluation and control unit 136 can transmit a signal to the beam deflection unit 130 such that the latter, on the basis of the signal from the evaluation and control unit 136, deflects the illumination light beam 122 in such a way that the illumination light beam 122 rotates over a defined object diameter in a manner offset by 20%, with 15%, particularly with 10% of its diameter. One example of such a rotation is illustrated in FIG. 3B. The detector unit 138 can be configured to capture, for different rotational positions, respectively one reflected light beam generated by the object 114 in response to the rotating illumination light beam 122. For the various rotational positions, the evaluation and control unit 136 can be configured to respectively determine the information item in respect of the illumination of the object 114, to compare said information item to at least one setpoint value and to determine the respective deviation. The evaluation and control unit 136 can be configured to determine the rotational position with the minimum deviation from the setpoint value. This rotational position is illustrated in FIG. 3C. The evaluation and control unit 136 can be configured to set the beam deflection unit 130 to the rotational position with the minimum deviation.

It is understood that the foregoing description is that of the exemplary embodiments of the disclosure and that various changes and modifications may be made thereto without departing from the spirit and scope of the disclosure as defined in the appended claims.

LIST OF REFERENCE NUMERALS

110 Apparatus
112 Beam path
114 Object
116 Retroreflectors
118 Spherical shell
120 Illumination unit
122 Illumination light beam
124 Light source
126 Optical unit
128 Beam expander optical unit
130 Beam deflection unit
132 Optical fiber
134 Lens
136 Evaluation and control unit
138 Detector unit
140 Localization unit

What is claimed is:

1. An apparatus for adjusting at least one beam path for tracking at least one object, the apparatus comprising:
   at least one illuminator configured to generate at least one illumination light beam;
   at least one optical device having at least one beam expander and at least one beam deflector, the at least one beam expander being configured to divergently expand the at least one illumination light beam and the at least one beam deflector being configured to deflect the at least one illumination light beam spatially about at least two different axes of rotation;
   at least one detector configured to capture a light beam reflected by the at least one object in response to an illumination by the at least one illumination light beam and to generate at least one measurement signal;
   at least one controller configured to:
   evaluate the at least one measurement signal to determine at least one information item related to the illumination of the at least one object,
   determine at least one control variable for (a) setting an effective focal length of the at least one beam expander, and (b) setting a spatial alignment of the at least one beam deflector depending on the at least one information item related to the illumination of the at least one object,
   determine whether a part of the at least one object is located outside of the at least one illumination light beam from the information item in respect of the illumination of the at least one object, and
   transmit at least one signal to the at least one beam deflector when the part of the at least one object is located outside of the at least one illumination light beam,
   wherein the at least one beam deflector is configured to deflect the at least one illumination light beam based on the at least one signal from the at least one controller such that the at least one illumination light beam rotates over a defined object diameter in a manner offset by 20%, by 15%, or by 10% of its diameter.

2. The apparatus according to claim 1, wherein the at least one controller is further configured to:
   determine the at least one control variable by comparing the at least one information item in respect of the illumination of the at least one object to at least one setpoint value and to adapt at least one of (a) the effective focal length of the at least one beam expander, and (b) the spatial alignment of the at least one beam deflector based on the at least one control variable.

3. The apparatus according to claim 1, wherein the at least one controller is further configured to:
determine the at least one control variable to control at least one variable selected from the group consisting of:
an information item related to a back-reflected intensity I,
a maximum back-reflected intensity max $\Sigma_i\, l_i$, where i is a number of parts of the at least one object with i=1 to N,
a variance of the intensity $varl_i$,
a maximization of a minimum back-reflected intensity max min $\Sigma_i l_i$,
a prediction of at least one object trajectory in space,
a distance of the at least one object from the at least one detector unit,
a number of back-reflected parts of the at least one object,
an information item related to a back-reflected region of the at least one object,
a signal-to-noise ratio,
a speed of the at least one object,
an external position information item,
an object position change over time,
information items related to an inertia of the at least one object, and
information items from additional sensor systems.

4. The apparatus according to claim 1, wherein:
the at least one beam deflector is configured to deflect the at least one illumination light beam through at least two angles in a measurement space, the apparatus being configured to move the at least one optical device through these two angles about at least two axes of rotation, and/or
the at least one beam deflector has at least one mirror configured to deflect the at least one illumination light beam, the at least one beam deflector having a mirror configured to deflect the at least one illumination light beam spatially about the at least two different axes of rotation or the at least one beam deflector having at least one first mirror and at least one second mirror, the at least one first mirror being configured to spatially deflect the at least one illumination light beam about a first axis of rotation and the at least one second mirror being configured to deflect the at least one illumination light beam spatially about a second axis of rotation.

5. An apparatus according to claim 1, wherein:
the at least one detector is configured to capture respectively one reflected light beam generated by the at least one object in response to a rotated illumination light beam for different rotational positions, and
the at least one controller is configured to:
for various rotational positions, respectively determine the information item in respect of the illumination of the at least one object,
compare the latter to at least one setpoint value and determine the respective deviation,
determine a rotational position with a minimum deviation from the at least one setpoint value, and set the at least one beam deflector to the rotational position with the minimum deviation.

6. The apparatus according to claim 5, wherein:
at least one of (a) the at least one detector and (b) the at least one illuminator is embodied as a localizator, and the localizator comprises at least one element selected from the group consisting of: a laser tracer, a laser tracker, a LIDAR sensor, and an FMCW-LIDAR sensor.

7. A coordinate measuring machine for measuring at least one workpiece, the coordinate measuring machine comprising:
the apparatus according to claim 1, and
at least one of (a) an active sensor, and (b) a passive sensor configured to probe the at least one workpiece, and
the at least one of (a) the active sensor, and (b) the passive sensor having at least one object.

8. A method for adjusting the at least one beam path for tracking at least one object, the method comprising:
(i) generating the at least one illumination light beam with at least one illuminator;
(ii) divergently expanding the at least one illumination light beam with at least one beam expander of at least one optical device;
(iii) spatially deflecting the at least one illumination light beam about the at least two different axes of rotation with at least one beam deflector of the at least one optical device;
(iv) capturing the light beam reflected by the at least one object in response to the illumination by the at least one illumination light beam with the at least one detector and generating at least one measurement signal;
(v) evaluating the at least one measurement signal with at least one controller, the evaluating of the at least one measurement signal comprising a determination of the at least one information item related to the illumination of the at least one object;
(vi) determining at least one control variable for (a) setting the effective focal length of the at least one beam expander, and (b) setting the spatial alignment of the at least one beam deflection unit based on the at least one information item related to the illumination of the at least one object;
(vii) controlling (a) the effective focal length of the at least one beam expander, and (b) the spatial alignment of the at least one beam deflection unit based on the at least one control variable;
determining whether a part of the at least one object is located outside of the at least one illumination light beam from the information item in respect of the illumination of the at least one object; and
transmitting at least one signal to the at least one beam deflector when the part of the at least one object is located outside of the at least one illumination light beam,
wherein the at least one beam deflector is configured to deflect the at least one illumination light beam based on the at least one signal from the at least one controller such that the at least one illumination light beam rotates over a defined object diameter in a manner offset by 20%, by 15%, or by 10% of its diameter.

9. A non-transitory computer-readable storage medium encoded with a computer program which, when executed on a computer or a computer network, causes the computer or computer network to carry out the method according to claim 8.

10. A non-transitory computer-readable storage medium encoded with a computer program which, when executed on a computer or a computer network, causes the computer or computer network to:

evaluate at least one measurement signal to determine at least one information item related to an illumination of at least one object;

determine at least one control variable for (a) setting an effective focal length of at least one beam expander, and (b) setting a spatial alignment of at least one beam deflector based on the at least one information item related to the illumination of the at least one object;

control (a) the effective focal length of the at least one beam expander, and (b) a spatial alignment of the at least one beam deflector based on the at least one control variable, determine whether a part of the at least one object is located outside of the at least one illumination light beam from the information item in respect of the illumination of the at least one object;

transmit at least one signal to the at least one beam deflector when the part of the at least one object is located outside of the at least one illumination light beam; and control the at least one beam deflector to deflect the at least one illumination light beam based on the at least one signal from the at least one controller such that the at least one illumination light beam rotates over a defined object diameter in a manner offset by 20%, by 15%, or by 10% of its diameter.

11. An apparatus for adjusting at least one beam path for tracking at least one object, the apparatus comprising:

at least one illuminator configured to generate at least one illumination light beam;

at least one optical device having at least one beam expander and at least one beam deflector, the at least one beam expander being configured to divergently expand the at least one illumination light beam and the at least one beam deflector being configured to deflect the at least one illumination light beam spatially about at least two different axes of rotation;

at least one detector configured to capture a light beam reflected by the at least one object in response to an illumination by the at least one illumination light beam and to generate at least one measurement signal;

at least one controller configured to:

evaluate the at least one measurement signal to determine at least one information item related to the illumination of the at least one object, and determine at least one control variable for (a) setting an effective focal length of the at least one beam expander, and (b) setting a spatial alignment of the at least one beam deflector depending on the at least one information item related to the illumination of the at least one object, wherein:

the at least one detector is configured to capture respectively one reflected light beam generated by the at least one object in response to a rotated illumination light beam for different rotational positions, and the at least one controller is further configured to:

for various rotational positions, respectively determine the information item in respect of the illumination of the at least one object, compare the latter to at least one setpoint value and determine the respective deviation, determine a rotational position with a minimum deviation from the at least one setpoint value, and set the at least one beam deflector to the rotational position with the minimum deviation.

12. The apparatus according to claim 11, wherein:

at least one of (a) the at least one detector and (b) the at least one illuminator is embodied as a localizator, and the localizator comprises at least one element selected from the group consisting of: a laser tracer, a laser tracker, a LIDAR sensor, and an FMCW-LIDAR sensor.

* * * * *